United States Patent [19]

Manninen

[11] Patent Number: 4,863,353
[45] Date of Patent: Sep. 5, 1989

[54] ATTACHING ARRANGEMENT

[75] Inventor: Heikki Manninen, Ummeljoki, Finland

[73] Assignee: A. Ahlstrom Corporation, Noormarkku, Finland

[21] Appl. No.: 121,539

[22] Filed: Nov. 17, 1987

[30] Foreign Application Priority Data

Nov. 20, 1986 [FI] Finland .................................. 864730

[51] Int. Cl.⁴ .............................................. F04D 29/34
[52] U.S. Cl. ........................... 416/204 R; 416/244 R; 403/359; 403/343
[58] Field of Search .................. 416/204 R, 205, 206, 416/244 R, 244 B; 403/260, 359, 343

[56] References Cited

U.S. PATENT DOCUMENTS

| 26,452 | 9/1968 | Dearborn | 403/343 |
| 2,152,805 | 4/1939 | Hoffmann | 416/229 |
| 3,359,912 | 12/1967 | Gates | 416/204 |
| 3,384,297 | 5/1968 | Dixon | 416/204 |

FOREIGN PATENT DOCUMENTS

| 319114 | 2/1920 | Fed. Rep. of Germany | 403/343 |
| 699916 | 11/1940 | Fed. Rep. of Germany | |
| 2822499 | 11/1978 | Fed. Rep. of Germany | |
| 93580 | 7/1844 | France | 416/204 |
| 8403757 | 7/1984 | Sweden | |
| 471974 | 6/1969 | Switzerland | |
| 530560 | 12/1972 | Switzerland | |
| 576074 | 5/1976 | Switzerland | |
| 600164 | 12/1977 | Switzerland | |
| 845234 | 8/1960 | United Kingdom | |
| 1185314 | 3/1970 | United Kingdom | |
| 1430308 | 3/1976 | United Kingdom | |
| 2022214 | 12/1979 | United Kingdom | |
| 2136918 | 9/1984 | United Kingdom | |

Primary Examiner—Robert E. Garrett
Assistant Examiner—John T. Kwon
Attorney, Agent, or Firm—Toren, McGeady & Associates

[57] ABSTRACT

An arrangement for attaching a machine element to a shaft, especially for impellers of pumps, comprises a spiral-formed key which is firmly fixed to the shaft, with the element to be attached being provided with a corresponding keyway.

8 Claims, 1 Drawing Sheet

ATTACHING ARRANGEMENT

FIELD AND BACKGROUND OF THE INVENTION

The present invention relates to an arrangement for attaching machine elements one to another and especially a machine element to a shaft. The invention is particularly suitable for the attachment of impellers of pumps and fans and most preferably it applies to the attachment of impellers of centrifugal pumps.

Several different methods are known for connecting e.g. impellers of centrifugal pumps to their shafts. The most conventional method is to use a flat key as disclosed in, for example, patent publications CH No. 530560 and CH No. 600164. In such a case, the impeller is fitted to the shaft so tightly that a press is needed for mounting the impeller on the shaft and a detaching device for removing it therefrom. Fitting has to be precise because there must be no clearance between the shaft and the impeller or between the key and the keyways which would allow the impeller to move relative to the shaft. If the impeller could move on the shaft, the changes in load during pumping would cause blow-like stresses on the key, which would be easily cut and broken. Furthermore, the problem with the key attachment is that it cannot restrain axial forces which are always generated at the pump impeller. The axial force that draws the impeller outwards from the shaft has to be restrained by a bolt or nut, which secures the attachment of the impeller to the shaft. The securing element, either a bolt or a nut, is subject to continuous stress, which causes a load on its threads, which may result in cutting of the thread.

Another method of attachment is a threaded connection as disclosed in GB patent publication No. 1430308 presenting as an example a turbocharger for the engine exhaust gases, the compressor impeller of which is threadedly fitted as shown in FIG. 2 of the publication. Threaded connections, however, involve several disadvantages which is why some users of centrifugal pumps do not accept this mode of attachment at all. In a threaded connection, the connected parts are normally guided relatively to each other in the side area of the thread. Stresses resulting from both radial and axial guiding are directed to the same area which is also subject, due to a slight pitch, to a great axial stress caused by the impeller torque. Thus, the surface pressures on the sides of the thread increase considerably involving a risk of the thread being cut, which occurrence will still further impede the replacement of the impeller which even now is difficult and time-consuming. Furthermore, if the shaft thread is damaged, the change of impeller becomes an unnecessarily big operation.

The threaded connection does not allow starting of a pump in an abnormal direction of rotation because the thread will open, the impeller moving axially outwards and breaking when hitting the walls of the pump. In such situations, it has been attempted to secure the attachment of the impeller by means of nuts or bolts, but a torque which opens the threaded connection even a small amount causes too great an axial force for a bolt or nut locking to hold. A bolt will break off or the threads of a nut will break. The reason for this is a slight pitch transforming a torque, even if its effect were only a minimal opening, into a high axial force. For these reasons one has to use big thread diameters and big securing elements. In other words, securing may call for stronger structural arrangements than otherwise necessary or possible.

A third method of attachment is conical arrangements as disclosed in CH-PS No. 471974 and CH-PS No. 576074, in the former of which the attachment is secured by a solid nut engagement. The immobility of the shaft and impeller themselves relative to each other is accomplished by the key effect of the cones. In the latter CH publication, the conical attachment is secured by a radial locking nut. Furthermore, heat expansion may be of help at the installation stage. This kind of attaching arrangement with no supporting elements between the impeller and the shaft to prevent their sliding relative to each other is not applicable to centrifugal pumps, at least not in ones with great differences in stock temperatures and with a high torque against stock pumping.

A fourth method of attachment is based on mere heat expansion of materials, but these arrangements have two severe weaknesses. A heat shock caused by some reason or another may suddenly loosen the impeller and make it rotate on its shaft. During maintenance, detaching the impeller of its shaft calls for heating of the impeller as well as plenty of time, just like the installation of a new impeller. Impellers fixed on their shafts by welding also belong to this group. Changing these impellers is at least as difficult as with the previous ones.

A fifth method of attachment is the use of a key shaft in fixing the impeller, as disclosed in DE application No. 2822499. The attachment is similar to the one used in e.g. power transmission equipment of vehicles and equivalent where slight axial sliding allowance is needed. In this application, the axial movement is prevented by a locking nut, which is subject to the whole axial load caused by the suction of the pump. A corresponding structure is also disclosed in GB patent publication No. 1185314, in which the pump shaft is for a part of its length square, said square portion being disposed in the axial center hole of the impeller. The axial securement is accomplished by an end nut.

All present methods of attachment have shortcomings which cause either risks or extra work and call for separate arrangements for preventing dangerous situations. Additional arrangements again normally result in extra time and more equipment needed for the change of a pump impeller.

SUMMARY OF THE INVENTION

The object of the present invention resides in creating a new and improved attachment arrangement, which ensures with simple means, a better and safer connection of the attached elements with improved force transfer. The object is showed by an attaching arrangement especially for attaching a machine element to a shaft. The attaching element is formed by either one or more spiral-formed attaching means.

The arrangement according to the present invention eliminates the disadvantages of the above arrangements without introducing any new problems. Especially the arrangement of the invention enables installation of an impeller with hand tools with no extracting devices or presses. More preferably, the impeller only needs one turn to be fixed on its shaft. The attachment comprising the impeller and its shaft receives the axial forces generated during pumping operation without transferring them further onto a securing element. Starting the pump in an abnormal direction of rotation does not break the securing element.

The attaching arrangement according to the invention especially is characterized in that the attaching element is a spiral-formed key which in a preferred embodiment is firmly fixed to the shaft and the element to be attached is provided with a corresponding keyway.

It is also essential to the attaching arrangement according to the invention that the key is turned in such a direction that the element to be attached tends to turn towards the shaft in normal use.

Further relevant features are described in the subclaims.

BRIEF DESCRIPTION OF THE DRAWINGS

The attaching arrangement according to the invention is further described with reference to the accompanying drawings, in which.

DESCRIPTION OF THE PREFERRED EMBODIMENT

Figure 1:
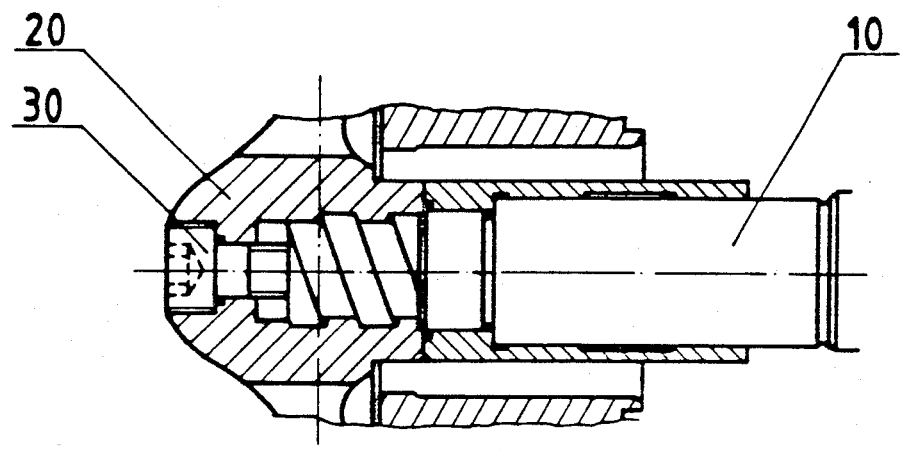
FIG. 1 is a sectional side view of a preferred embodiment of the invention.
Figures 2, 3:
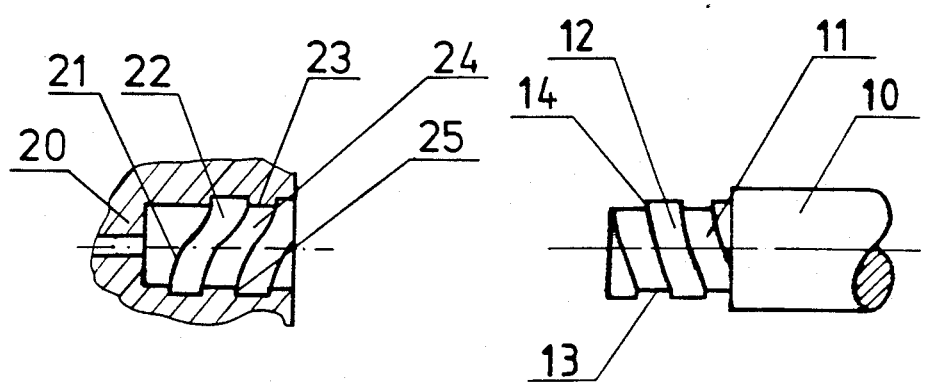
FIG. 2 illustrates the shaft of FIG. 1 as separated.
FIG. 3 is a sectional view of the impeller of FIG. 1 as separated.

According to the figures, the attaching arrangement comprises a shaft 10, a piece attached thereto, for example an impeller 20 and an element 30 securing the attachment, which element may be either a screw (FIG. 1) or a nut. On the shaft 10 is machined a spiral-formed keyway 11, the axial cross section of which is substantially rectangular. Correspondingly, in the center hole 21 of the impeller 20 is machined a spiral-formed keyway 22, the axial cross section of which is also essentially rectangular. Ridges 23 limiting the spiral-formed keyway 22 are so dimensioned that they can be turned into the spiral-formed keyway 11 of the shaft 10. The ridge 12 of the shaft 10 can also be correspondingly turned tightly into the spiral-formed keyway 22 of the shaft 20. Radial guiding of the attachment is effected through the inner surface 24 of the ridge 23 of the impeller 20 and through the bottom surface 13 of the keyway 11 of the shaft 10, which both extend parallel to the axis of the shaft 10. Axial guiding is effected through the side surfaces 14, 25 of the ridges 12, 23, which extend substantially radially of shaft 10 and perpendicularly to the axis of shaft 10. Transferring of the torque rotating the impeller 20 is also effected through the same side surfaces.

Thus, in view of the radial guiding and torque transfer, it is a question of a key connection, in which the conventional axial key is replaced by a spiral-formed key 12, which is fitted to its keyway 22. Unlike a conventional key, the one according to the invention is capable of receiving axial forces. Consequently, a securing element 30 is subject to no stresses in normal operation because the direction of the spiral draws the rotating impeller inwards, and the axial force in the opposite direction on the impeller of the pump does not increase, whereas in an ordinary key connection the axial force continuously fatigues the securing element.

The task of the securing element 30 is to hold the impeller in place in the axial direction, should the pump for some reason be operated in the wrong direction. Even so, the securing element 30 will not be under excessive stress because the pitch of the spiral-formed key 12 is so high that the force cannot increase to a great extent.

Let us illustrate the difference between the attachment with a spiral-formed key and the conventional threaded connection by the following calculation example in which forces operating in the axial direction are compared with each other when e.g. the impeller is turned in a wrong direction by a torque M and when the diameter of the thread spiral is d. There is the following condition between the axial force $F_a$ and the turning torque M:

$$M = F_a \cdot \frac{d}{2} \cdot \tan \alpha \text{ in which } \alpha = \text{pitch angle of the spiral}$$

In the following the conventional threaded connection is indicated with a subscript t and the attachment with a spiral-formed key with a subscript k. When both modes of attachment are strained by the same torque, we obtain the following equations:

$$F_{at} \cdot \tan \alpha_t \cdot \frac{d}{2} = F_{ak} \cdot \tan \alpha_k \cdot \frac{d}{2}$$

and further $$F_{at} \cdot \tan \alpha_t = F_{ak} \cdot \tan \alpha_k \text{ and}$$

$$\frac{F_{at}}{F_{ak}} = \frac{\tan \alpha_k}{\tan \alpha_t}$$

By setting the conventional angle $\alpha_t = 3°$ for the threaded connection and $\alpha_K = 15°$ for the spiral key, the latter value being the minimum value for the pitch angle of the spiral-formed key, the following equation is obtained:

$$\frac{F_{at}}{F_{ak}} = \frac{\tan 15°}{\tan 3°} \approx 5.$$

If the angle $\alpha_K = 30°$, said ratio will be which values mean in practice that the diameter of the locking screw needed by the spiral key is at least less than a half ($1/\sqrt{5}$) of the diameter of the locking screw needed by an ordinary threaded connection. In other words, it is possible to reliably secure the spiral key attachment by a screw even though the threaded connection could not in a corresponding case be secured by a screw because it would be too big.

A preferred embodiment is an attaching arrangement in which the spiral pitch is 0.8–1.2× the shaft diameter and most preferably of the same dimension as the shaft diameter and the length of the spiral-formed key corresponds to one spiral turn around the shaft. The spiral pitch should be at least greater than the radius of the shaft. Furthermore, the ridge width of both the shaft and the impeller in the axial direction corresponds to approximately a half of the spiral pitch. The earlier disclosed comparable dimensions are based on this embodiment. Considerable changes to the dimensions are possible without changing the principal function of the attaching arrangement from what has been described above.

The above description discloses only one preferred embodiment in which the key 12, for example, is firmly fixed to the shaft 10. Alternatively, a fixed key may be disposed on the impeller. It is also possible that keyways of an equal size are machined in the impeller, in which keyways corresponding spiral-formed keys are fixed at the installation stage. However, this version is not preferred because the amount of work involved will increase and the attachment arrangement will become less secure. It is possible to replace the securing element 30, either a screw or a nut, illustrated in FIG. 1 by some other element, for example by a locking ring, which is also capable of bearing axial stresses.

Another embodiment is an arrangement in which the attaching element comprises several spiral-formed keys. In this case the key pitch can be increased, whereby the force component in the axial direction will be correspondingly reduced. Another advantage is a higher torque transfer capacity by the same surface pressure or, on the other hand, reduction of the surface pressure by the same transferred torque.

As described above, the application of attaching an impeller of a centrifugal pump is only an example; the invention is correspondingly applicable to other attachments of similar types.

Furthermore, there are several other alternative embodiments of the attaching arrangement according to the present invention which have not been disclosed above, but which are included in the protective scope of the enclosed claims, which scope has not been intentionally limited by the above description.

I claim:

1. An attaching arrangement especially for attaching a machine element to a shaft,
    wherein the attachment is secure against loosening due to counter-rotation by a locking screw against the shaft end, and an attaching element formed of at least one spiral-formed attaching key on one of the shaft and the element, and a spiral-formed keyway for receiving the key in the other of the shaft and the element, the key having a ridge with side surfaces which extend substantially perpendicularly to the axis of the shaft wherein a pitch of the spiral - formed key is equal to the diameter of the shaft multiplied by approximately 0.8 to 1.2
    and a bottom surface which extends substantially parallel to the axis of the shaft.

2. An attaching arrangement according to claim 1, wherein the spiral-formed attaching key is an integral part of a member to be attached a counterpart of the key being a keyway in another member to be attached.

3. An attaching arrangement according to claim 1 or 2, wherein both the key and the keyway have axial cross-sections which are substantially rectangular.

4. An attaching arrangement according to claim 2, wherein the spiral-formed key has a pitch which is higher than the radius of the shaft.

5. An attaching arrangement according to claim 1, wherein the spiral-formed attaching key is firmly fixed to the shaft, the keyway being in the element to be attached.

6. An attaching arrangement according to claim 1, wherein in a radial direction, an axial surface adjacent to the key on the shaft and an axial surface adjacent to the keyway in the element to be attached form guiding surfaces and, in an axial and circumferential direction, the side surface of the key and a side surface of the keyway form guiding surfaces.

7. An attaching arrangement according to claim 1, wherein the spiral formed key has a turning direction such that, in normal operation, the
    element to be attached tends to turn towards the shaft.

8. An attaching arrangement according to claim 1, wherein the machine element is an impeller of a centrifugal pump, said arrangement attaching the impeller to a shaft.

* * * * *